(12) United States Patent
Aono et al.

(10) Patent No.: US 6,632,293 B1
(45) Date of Patent: Oct. 14, 2003

(54) HIGHLY ACTIVATED HYDROGEN CONTAINING MATERIAL AND METHOD FOR PRODUCING THE MATERIAL

(75) Inventors: Fumiaki Aono, Tokyo (JP); Toshiharu Tabata, Tokyo (JP); Akiyoshi Kosuge, Tokyo (JP); Hirohisa Kikuyama, Izumiotsu (JP); Hiroto Izumi, Izumiotsu (JP)

(73) Assignees: The Japan Steel Works, Ltd., Tokyo (JP); Stella Chemifa Corporation, Osaka (JP)

( * ) Notice: Subject to any disclaimer, the term of this patent is extended or adjusted under 35 U.S.C. 154(b) by 41 days.

(21) Appl. No.: 09/699,423

(22) Filed: Oct. 31, 2000

(30) Foreign Application Priority Data

Nov. 9, 1999 (JP) ............................................. 11-318576

(51) Int. Cl.$^7$ ............................................. C23C 22/00
(52) U.S. Cl. ....................... 148/240; 148/242; 148/247; 148/273; 148/283; 427/419.1
(58) Field of Search ................................. 148/240, 242, 148/247, 273, 283; 427/419.1

(56) References Cited

FOREIGN PATENT DOCUMENTS

| EP | 3234671 C | 6/1983 |
| JP | 11-025961 A | * 1/1999 |

* cited by examiner

Primary Examiner—John Sheehan
Assistant Examiner—Andrew L. Oltmans
(74) Attorney, Agent, or Firm—Birch, Stewart, Kolasch & Birch, LLP

(57) ABSTRACT

A hydrogen containing material comprises a first compound including hydrogen containing material and fluoride, and a second compound including a metal which becomes highly reactive with hydrogen when the metal becomes a compound including fluorine, and a compound including fluorine. The first compound and the second compound are integrally formed into a one-piece layer on the surface of the hydrogen containing material. The metal which becomes highly reactive with hydrogen when the metal becomes a compound including fluorine is at least one metal selected from a rare earth metal, rare earth alloy, Fe, Al, Mg, Ca, Mn, Zn, Zr, Li, or alloys comprising these elements.

5 Claims, 5 Drawing Sheets

HIGHLY ACTIVATED HYDROGEN CONTAINING MATERIAL AND METHOD FOR PRODUCING THE MATERIAL

BACKGROUND OF THE INVENTION

The present invention relates to a hydrogen containing material and to a method for producing the material, and more particularly relates to a hydrogen containing absorbing material which is highly activated with hydrogen so as to be used as the negative pole material of the nickel-hydride cell, medium for storing and transporting hydrogen, catalyst for hydrogenizing carbon oxide and for converting it to hydrocarbon, medium for energy conversion, medium for recovering hydrogen gas from low concentration hydrogen gas and for purifying the hydrogen gas, and others, and to have the protective effect against the poison of the poisonous material (hereinafter called poisoning restraining effect).

The hydrogen containing (absorbing) material reversibly absorbs and discharges hydrogen by the treatment of heating, cooling, decompressing or pressuring thereof. Therefore, the hydrogen containing material is expected to become a storing material of hydrogen as a future secondary energy. Recently, the hydrogen containing alloy is used as the negative pole material of nickel-hydride cell and expected as a future high quality battery for the electric motor vehicle.

In order to stably cause the hydrogen containing material to absorb and discharge the hydrogen, it is necessary to carry out the initial hydrogenation treatment at high temperature, or high pressure, or high vacuum. For example, in the case of Mg—Ni alloy as the hydrogen containing material, the reaction vessel is evacuated at 350° C., and the absorbing and discharging of hydrogen must be repeated over 10 times at 2–5 MPa. In the case of La—Ni alloy or La—Ni—Al alloy as the hydrogen containing material, the reaction vessel is evacuated at 80–100° C., and the absorbing and discharging of hydrogen is repeated over 10 times at 1–3 MPa. In order to keep the surface of the hydrogen containing alloy in very high active condition, the alloy must not be contacted with air. If the alloy is exposed to the air, the alloy is immediately oxidized so that the dissociation from hydrogen element to hydrogen atom is inhibited. Further, the hydrogen activity characteristic of the hydrogen containing alloy is remarkably reduced by a particle impurity gases included in the hydrogen gas such as CO, $CO_2$, $O_2$, $H_2O$, $NH_3$ and others.

Japanese Patent Publication 3-12121 discloses a microcapsule method of copper or nickel by the electroless plating in order to improve the thermal conductivity of the hydrogen containing material and to protect the material from impurity gases other than the hydrogen gas.

The Japanese Patent Application Laid Open Publication 5-213601 discloses treatment methods for highly activating and stabilizing the hydrogen containing material by treating the surface of the material using the supersaturation aqueous solution consisting of the fluoride metallic compound including alkali metal.

The Japanese Patent Application Laid Open Publication 8-9504 discloses material for hydrogen containing alloy which material is coated with electroconductive powder and cuprous oxide powder and with oxidation inhibitor by mixing the powder for hydrogen containing alloy, conductive powder, and cuprous oxide powder with a high energy mixer, in order to improve the initial hydrogenation characteristic and to maintain the characteristic for a long term, and discloses a method for producing the material.

However, none of the materials and method is proper for mass production on account of the installation cost, production efficiency and production cost. Although it is confirmed that the material has a protective effect against impurity gases other than the hydrogen of the hydrogen containing material, there are problems in stability and durability of the surface treatment layer at the absorbing and discharging of hydrogen.

At present, a hydrogen containing alloy is used for the negative pole material of the small secondary battery, and almost all alloys are $AB_5$ alloys of the rare earth. As typical alloys, polyatomic alloys wherein the element A is La or rare earth metal alloys Mm (Misch-metall) and the element B is alloy produced by substituting Ni and a part of Ni with other elements (Co, Al, Mn, Si, Cr, Zr and others) are used. For example, there is alloys $NaNi_5$, $MmNi_{2.5}$, $LaNi_{4.7}Al_{0.3}$ and $MmNi_{4.5}Mn_{0.3}Al_{0.2}$. The composing elements and composition ratio are selected in accordance with the using conditions. The hydrogen containing alloy is used not only for the secondary battery, but also for the chemical heat pump which uses the storage and the purification of hydrogen gas and the reaction heat of the alloy.

The reason why the rare earth $AB_5$ alloy is substantially used is that the alloy can be initially activated with ease, has a great poisoning restraining effect, and can be easily treated compared with other alloys. However, the alloy is poor in durability. More specifically, the absorbing quantity of hydrogen reduces as the absorbing and discharging cycle increases. The alloy can not be used more than several thousand times. Therefore, although the alloy has a durability necessary for the negative pole material of the secondary battery, it is difficult to use the alloy for other fields which require much longer durability. Furthermore, there is a problem that the reduction rate of durability of the alloy further increases in the atmosphere at a temperature more than 150° C.

As hydrogen containing alloys having at least one of the durability and a high hydrogen containing capacity, and having a possibility for highly balancing both the characteristics, there is titanium-base hydrogen containing alloy, zirconium-base hydrogen containing alloy, and vanadium-base hydrogen containing alloy, and others. However in spite of the fact that these alloys have the above described characteristic and do not deteriorate at high temperature, there are considerable number of alloys having difficulty in initial activation and sensitivity influenced by poisoning (atmosphere exposure, impurity gases in hydrogen gas such as CO, $H_2O$, $O_2$, $H_2S$). As a result, these alloys can not exercise their inherent performance, and hence have problems in treatment thereof.

In order to improve reactivity, durability, hydrogen dissociation pressure-composition isothermal characteristic, and initial hydrogenation characteristic, polyatomic alloys are developed, which alloy is produced by substituting a part of a basic hydrogen containing alloy with another element. For example, a part of an alloy such as rare earth-base alloy, magnesium-base alloy, titanium-base alloy, zirconium-base alloy, or calcium-base alloy is substituted with another single element such as Al, Mn, Cr, Fe, or Cu, or with plural elements. However, an alloy having a remarkable protective effect against an impurity other than hydrogen is not developed.

In order to resolve the above described problems in the conventional alloys, the inventors of the present invention proposed highly activated hydrogen containing materials and the method for producing the materials, wherein on a surface of hydrogen containing alloy such as rare earth-base alloy, magnesium-base alloy, titanium-base alloy, zirconium-base alloy, or calcium-base alloy, a compound layer including fluorine is formed so as to highly activate the hydrogen containing alloy with hydrogen.

For example, in Japanese Patent Publication No. 2835327, there is disclosed a method for highly activating and for stabilizing the hydrogen containing material, wherein a hydrogen containing material and a hydrofluoric anhydride solution are contacted with each other so that a metallic fluoride film of the metal composition of the hydrogen containing material itself is formed on the material.

In the Japanese Patent Application Laid Open Publication 10-219301, there is disclosed a highly activated hydrogen containing material and a method for producing the material, wherein a hydrogen containing material including at least one of elements Al, Fe, Mg, Ca, Mn, Zn, Zr, and Li is fluorinated, thereby forming a fluoride of the metal on the surface or in a surface layer of the hydrogen containing material.

Furthermore in the Japanese Patent Application Laid Open Publication 10-219301, there is a disclosed highly activated hydrogen containing material and a method for producing the material, wherein a metal which becomes high active with hydrogen when fluorinated is preliminarily coated in the hydrogen containing material, thereafter the coating metal is fluorinated or treated so as to become fluoride. As a result, the hydrogen containing material becomes active with hydrogen.

In accordance with the method described in the Japanese Patent No. 2835327, it is possible to highly activate and stabilize the hydrogen containing material without a large installation and complicated steps. Therefore, the method has an advantage in mass-producing. However, there also exists a hydrogen containing material wherein a fluoride layer can not be formed on the material, or even if a fluoride layer can be formed on the material, the fluoride layer is impossible to become high active with hydrogen, because of the kind of the hydrogen containing material.

The former highly activated material and the producing method described in the Japanese Patent Publication 10-219301, has the same advantage as that of the Japanese Patent Publication No. 2835327. However, the metal which becomes high active is included in the hydrogen containing material itself. Therefore, only metals exposed on the surface of the hydrogen containing material are effective. If a small amount of a high active fluoride exists on the surface of the hydrogen containing material, the material has an effect though the amount is small. However, in the absorption and discharge reaction which accompanies a surface reaction, and in the methanization reaction which reacts $H_2$ with CO, $CO_2$ and others to them to hydrocarbon gas such as $CH_4$, it is more preferable that a large amount of active portion exists on the surface. The hydrogen containing alloy is made into an alloy corresponding to the using condition of the alloy by adding another element to a basic composition element or substituting, with another element in accordance using temperature and pressure condition. Therefore, it is difficult to compose the hydrogen containing alloy only by metal which is highly activated by becoming fluoride. Consequently, such a hydrogen containing material can not be highly activated by the above described producing method.

In the latter hydrogen containing material and the producing method, since the hydrogen containing material is coated with a fluoride of high activity with hydrogen regardless of the composition element, the hydrogen containing material has a high reactivity with hydrogen. However, the hydrogen containing material as the matrix and the fluoride coating the material are basically different from each other in kind. Consequently, there may occur that the fluoride layer on the surface of the hydrogen containing material peels off because of expansion and contraction of the material at the absorption and discharge of hydrogen.

SUMMARY OF THE INVENTION

Accordingly, an object of the present invention is to resolve the above described problems in the prior arts, more particularly to provide a hydrogen containing material having a hydride layer on the surface, which hydride layer has a high reactivity with hydrogen, so that the hydrogen containing material is highly activated with hydrogen more than the inherent reactivity of the material despite a poisoning environment.

Another object of the present invention is to provide a hydrogen containing material having a fluoride layer which is not peeled off from the surface so that it is possible to maintain a high reactivity with hydrogen for a long term, while at least one of characteristics that is the durability of the hydrogen containing material itself and the high hydrogen absorbing capacity is maintained.

A further object of the present invention is to provide a method for easily forming a fluoride layer having a high activity with hydrogen on the surface of a hydrogen containing material so as not to peel.

According to the present invention, there is provided a hydrogen containing material the surface of which has layers comprising a first compound including the hydrogen containing material and fluorine, and a second compound including a metal which becomes high reactive with hydrogen when the metal becomes a compound including fluorine and a compound including fluorine, wherein the first compound and the second compound are integrally formed into a one-piece layer on the surface of the hydrogen containing material.

The hydrogen containing material comprises an ingot, or powder of a material or intermediate product or finished product of an alloy selected from a zirconium alloy, titanium alloy, vanadium alloy, rare earth alloy, and magnesium alloy.

Furthermore, the metal which becomes high reactive with hydrogen when the metal becomes a compound including fluorine is at least one metal selected from a rare earth metal, rare earth alloy, Fe, Al, Mg, Ca, Mn, Zn, Zr, Li, or alloys comprising these elements.

According to the present invention, the method for producing a hydrogen containing material comprises the steps of contacting a metal which becomes high reactive with hydrogen when the metal becomes a compound including fluorine with a fluorinating treatment liquid, thereby fluorinating the metal contacting a hydrogen containing material with the fluorinating treatment liquid contacted with said metal, thereby forming an integral layer comprising a first compound including the hydrogen containing material and fluorine, and a second compound including the fluorinated metal and fluorine on the surface of the hydrogen containing material.

The metal is melted in the fluorinating treatment liquid in a metal ion condition or in an ultrafine grain condition.

The fluorinating treatment liquid contacted with the hydrogen containing material is heated so as to vaporize the liquid to dry the hydrogen containing material.

The metal which becomes high reactive with hydrogen when the metal becomes a compound including fluorine is at least one metal selected from a rare earth metal, rare earth alloy, Fe, Al, Mg, Ca, Mn, Zn, Zr, Li, or alloys comprising these elements.

The fluorinating treatment liquid is a hydrofluoric acid aqueous solution or hydrofluoric anhydride solution, or solution composed by at least one of organic compounds such as piridine, triethlamine and isopopyl alcohol, and hydrofluoric anhydride.

It is possible to select a desired thickness of the metal fluoride layer on the surface of the hydrogen containing material so as to extend to a desired depth in accordance with the use of the hydrogen containing material.

In the hydrogen containing material of the present invention, in the cases that a large amount of metals which become high active when fluorinated are included in the basic composition elements, that a small amount of metals which become high active are included in the composition elements, or that highly activated metal is not included, in any case, it is possible to form a large amount of very highly activated fluoride layers, compared with a hydrogen containing material which is simply treated by fluorine, on the surface of the hydrogen containing material.

In the boundary surface between the hydrogen containing material as the matrix and the fluoride, a compound layer in which the concentration of elements composing the matrix and the concentration of the fluoride are changed in inclined conditions is formed. The surface of the material is in the condition the fluoride of the matrix and the fluoride of the highly activated metal are mingled.

In another case, in the boundary surface between the hydrogen containing material as the matrix and the fluoride, a compound layer in which the concentration of elements composing the matrix and the concentration of the fluoride are gradually changed in inclined conditions is formed, and the fluoride of the matrix is formed on the outer surface of the compound layer, and further on the outside of the outer surface, the fluoride of the highly activated metal is formed.

By forming the fluoride layer of metal the concentration of which changes in inclined condition, it is possible to prevent the metallic fluoride from exfoliating from the hydrogen containing material. Therefore, it is possible to maintain high activity with hydrogen for a long term in spite of a poisoning environment, while maintaining at least one of durability of the hydrogen containing material itself and a large capacity for absorbing hydrogen.

Furthermore, in accordance with the method for producing hydrogen containing material of the present invention, by contacting the treatment liquid for fluorinating the metal and the hydrogen containing material with each other, the metallic fluoride is formed on the surface or on the surface portion of the hydrogen containing material. Therefore, it is possible to produce the hydrogen containing material by a simple device with ease, and to correspond to the mass production.

These and other objects and features of the present invention will become more apparent from the following detailed description with reference to the accompanying drawings.

DETAILED DESCRIPTION OF THE PREFERRED EMBODIMENT

Hydrogen containing materials used in the present invention are hydrogen containable metals or alloys, in particular titanium alloys (titanium-base alloys), zirconium alloys, rare earth alloys, and magnesium alloys. Specifically, for example, here is given as titanium alloys, TiFe, TiCo, TiNi, TiMn$_2$, TiCr$_2$, TiV, as zirconiumalloys, ZrV$_2$, Zrcr$_2$, ZrMn$_2$, ZrFe$_2$, ZrCo$_2$, as rare earth alloys, LaNi$_5$, MmNi$_{2.5}$Co$_{2.5}$, LaNi$_{4.7}$Al$_{0.3}$, MmNi$_{4.5}$Mn$_{0.3}$Al$_{0.2}$, MmNi$_{4.7}$Al$_{0.2}$Zr$_{0.1}$, LaNi$_{4.5}$Cr$_{0.25}$Mn$_{0.25}$, Mm$_{0.5}$Ca$_{0.5}$Ni$_5$, as magnesium alloys, Mg$_2$Ni, Mg$_2$Cu.

In order to adjust and improve the dissociation pressure characteristic, plateau, hysteresis of the hydrogen containing material, polyelement alloys which are formed by addition or substitution of other elements can be used.

Although the above described hydrogen containing materials are intermetallic compounds, vanadium alloys called as the solid solution hydrogen containing alloy can be used. There are various alloys such as $(V_{0.9}Ti_{0.1})_{0.8}Fe_{0.2}$, $(V_{0.9}Ti_{0.1})_{0.9}Al_{0.1}(V_{0.8}Ti_{0.15})_{0.8}Mn_{0.2}$, $V_{0.8}Ti_{0.2}$, $V_3Mn_{0.4}Ni_{0.6}$.

As the metal which is formed on the surface of the hydrogen containing material as the fluoride and has a high reactivity with hydrogen, there is given rare earth metal, alloy including rare earth metal, Fe, Al, Mg, Ca, Mn, Zn, Zr, Li and alloys including these metals. As the rare earth metal, La and Mm are preferable. As alloy including rare earth metal, AB$_5$ type alloy, which is hydrogen containing alloy, such as LaNi$_5$, and polyelement alloy in which a part Ni is substituted with another element (Al, Mn, Co, Cr, Si, Zr and others) can be used.

The rare earth alloy is not limited to above described composition for the object of the present invention, and alloys of non-stoichiometry composition may be used.

As the A in the AB$_5$ type alloy, rare earth metal or rare earth metal alloy other than La may be used, and as the B, elements other than Ni may be used. The alloy which has not hydrogen containing performance may be used. Catalyst having a high reactivity with hydrogen excels in catalytic activity in proportion to the increasing of the surface activity. As fluoride having a high surface acidity, there is given FeF$_2$, AlF$_3$, MgF$_2$, CaF$_2$, LiF$_2$. Forming of such a fluoride on the surface of the hydrogen containing material is effective in increasing of activity thereof.

As treating solution for forming a metallic fluoride layer on the surface of the hydrogen containing material, hydrofluoric acid aqueous solution or hydrofluoric anhydride solution, or solution composed by at least one of organic compounds such as piridine, triethlamine and isopopyl alcohol, and hydrofluoric anhydride is used. The above described metal is contacted with the treating solution or added at a temperature between −200° C. and 200° C., preferably between −40° C. and 100° C., thereby melting ultrafine particles of the metal ion into the solution in a described amount at least one of the conditions.

The hydrogen containing material is immersed in the treating solution including the metal to fluorinate the material. If the surface of the hydrogen containing material is excessively fluorinated, the inherent characteristics of the hydrogen containing material is deteriorated. Therefore, in order to restrain the reaction, it is preferable to use a solution containing a small amount of water. In the case of the hydrofluoric acid aqueous solution, it is preferable to use the solution having a molality of 70% or more. When the above described other solutions are used, the molality is the same as the hydrofluoric acid aqueous solution.

Therefore, the hydrogen containing material is dried at a temperature between the room temperature and 500° C., preferably between 100° C., and 250° C., purging with a gas such as Ar, $N_2$, He which has not a bad influence upon the fluorination treatment. Further, after the atmosphere of the hydrogen fluoride is discharged, the hydrogen containing material undergoes heat treatment at the dry temperature or more to stabilize the fluoride layer formed on the surface of the hydrogen containing material. By the heat treatment, the fluoride of the metal composing the hydrogen containing material itself and the metallic fluoride included in the treating solution are integrated, on the surface of the hydrogen containing material.

In the above described process, the treating solution in the reaction vessel is vaporized by the heating of the solution, without separating an excessive solution. If it takes long time for vaporizing the treating solution having a low concentration of the ultrafine particles of the metal ion and it is preferable to separate the treating solution. However, there may be occurred that the metal included in the treating solution is formed on the surface of the hydrogen containing material as a fluoride, dependent on the kind of the metal. Therefore it is preferable to select the concentration and to separate the excessive solution in dependency on the kind of the hydrogen containing material and the kind of the metal included in the treating solution.

The hydrogen containing material having the fluoride film on the surface thereof by the above described process has a high activity to the hydrogen molecule. Furthermore, even in the poisonous environment, the hydrogen containing material stably keeps the activity to the hydrogen.

There is difference in the form of the metal fluoride film formed on the surface of the hydrogen containing material in dependency on the kind of the hydrogen containing material and the kind of the metal included in the treating solution, as following examples.

(1) The fluoride of the metal composing the hydrogen containing material is formed on the surface of the material, and the metal included in the treating solution becomes fluoride, the fluoride film is formed in the condition that both fluorides are mingled together.

(2) After the fluoride of the metal composing the hydrogen containing material has been formed on the surface of the material, the metal included in the treating solution becomes fluoride which is formed on the metal fluoride.

(3) The metal of the surface of the hydrogen containing material is fluorinated and melted in the treating solution, and the melted metal fluoride is formed again on the surface of containing material as a fluoride film together with the metal in the treating solution when the solution is dried.

Although it is preferable that the all surface of the hydrogen containing material is coated with the fluoride of the metal, it is allowable that the hydrogen containing materials are contacted with each other so that the contacted surfaces are not covered by the fluoride. If the active fluoride exists only on a part of the surface of the hydrogen containing material, it is possible to maintain high reactivity.

The depth and other conditions of the fluoride of the metal of the hydrogen containing material can be properly adjusted by adjusting the treatment period of time, treating temperature and others in accordance with the use of the hydrogen containing material. Further, there is a case that metals other than fluorine, the hydrogen containing material and metals included in the treating solution are included in the fluoride film formed on the hydrogen containing material. For example, treated in such an environment as atmosphere where the surface of the hydrogen containing material is oxidized and hydroxided, oxide and hydroxide are formed. Therefore, in the compound layer formed on the surface of the hydrogen containing material, compounds such as M, O-M, F-M, F—O-M (F: fluorine, O: oxygen, M: metal) are mingled in a stoichiometrically stable condition or in a stoichrometrically unstable (non-stoichiometric composition). There may be a case where other elements other than metals included in the treating solution are included in the fluoride film on the surface of the hydrogen containing materials.

Although there is a case where the fluoride film is formed in substantially uniform thickness, there is a case that partial projections are formed on the film. In either case, the hydrogen containing material as the matrix becomes fluoride and a gradient diffusion layer of the hydrogen containing material and the fluoride is formed in the boundary layer between the hydrogen containing materials and the fluoride. (In the boundary layer, the fluorine concentration reduces toward the inside and the concentration of the metal composing the hydrogen containing material increases in reverse.)

Therefore, the fluoride on the hydrogen containing material is kept in a stable condition without peeling off despite the expansion and contraction caused by the containing and discharging of the hydrogen. The surface of the hydrogen containing materials is finely powdered by the containing and discharging of the hydrogen. Therefore if the containing and discharging is repeated a neo-surface (metal surface) is exposed. However, if a fluoride having a high activity exists on a part of the hydrogen containing material, it is possible to maintain a high reactivity.

As described above, a film consisting a metal fluoride as a main component on the surface of the hydrogen containing material by treating with the hydrofluoric acid aqueous solution or hydrofluoric anhydride solution or solution composed by at least one of organic compounds such as piridine, triethlamine and isopopyl alcohol, and hydrofluoric anhydride. Therefore, the hydrogen containing material has a high activity with the hydrogen element. In the prior art, in order to initially activate the hydrogen containing material, the material must be treated at a high temperature and a high pressure and in a high vacuum.

In accordance with the present invention, the hydrogen containing materials can be initially activated without high temperature, high pressure, and high vacuum. Furthermore, since the fluoride film formed on the surface is a stable compound layer, there is no danger of ignition of the hydrogen containing material in the atmosphere. Since the hydrogen containing material having the fluoride film has a poisoning restraining effect other than the hydrogen element, the danger problem at the treatment of the hydrogen containing material is solved. As a result, the upkeep for installations, production and transportation can be largely reduced. Since the fluoride film is formed by the reaction in the solution of high concentration or in the anhydride solution, a large installation and complicated technique in the reaction treatment are not necessary. Both of the high activation and the stabilization treatment of the hydrogen containing material which can be mass produced can be carried out at the same time.

EXAMPLE I

The alloy $TiFe_{0.8}Mn_{0.2}$ as the hydrogen containing material was mechanically powder and classified into less than 250 µm by a screen. The alloy powdered of 100 g was put in a first reaction vessel. On the other hand, the alloy $LaNi_{4.7}Al_{0.3}$ was mechanically powdered and classified into less than 38 µm, and the alloy powder of 100 g was put in a second reaction vessel. More than 9N high-purity hydrofluoric anhydride solution of 100 cc was poured in the second reaction vessel and kept for three minutes at a temperature of about 80° C. Thereafter, while the powder $LaNi_{4.7}Al_{0.3}$ was filtered by a filter paper, the hydrofluoric anhydride solution was transferred to the first reaction vessel in which the powder of $TiFe_{0.8}Mn_{0.2}$ is put. The first reaction vessel was put in a constant temperature tank heated at 100° C. and $N_2$ gas was flowed in the first reaction vessel to vaporize the hydrofluoric anhydride solution, thereby drying the vessel. After the drying, the temperature of the constant temperature tank was increased to 150° C. and kept for one hour to heat-treat the alloy. Thereafter, the hydrogen containing material was cooled to approximately room temperature, while $N_2$ gas was flowed in the first reaction vessel. The hydrogen containing material was taken out from the first reaction vessel. Thus, the alloy powder $TiFe_{0.8}Mn_{0.2}$ having a fluoride film in which F, La, Al and Ni are formed on the surface of the powder in the mingled condition was obtained.

According to the observation of the surface of the alloy $TiFe_{0.8}Mn_{0.2}$ with a scanning electron microscope, protrusive product of about 0.1–0.3 µm, was formed on the surface. It was confirmed that there is existed F, La, Al, Ni which do not exist in the untreated alloy on the surface in the mingled condition, as a result of the element analysis of the surface of the alloy after the treatment with an energy dispersion type X-ray analysis device. The elements melted in the hydrofluoric anhydride solution in the second reaction vessel were analyzed with an inductive coupling plasma light emitting analyzing device.

The Table 1 shows the result of the analysis and proportions of the molten elements. As a result, La and Al are melted more than the ratio by mass of the original alloy $LaNi_{4.7}Al_{0.3}$. The proportions are approximately equal to the proportions of quantitative analysis result of La, Ni, Al where Ti, Fe, Mn are removed by the energy dispersion type X-ray analysis device. Therefore, it is considered that the metal ion of the molten $LaNi_{4.7}Al_{0.3}$ in the hydrofluoric anhydride becomes a compound with fluorine and is finally stuck on the alloy powder $TiFe_{0.8}Mn_{0.2}$ in the treatment of the vaporizing of the hydrofluoric anhydride.

TABLE 1

|  | Proportion of $LaNi_{4.7}Al_{0.3}$ | Analysis Proportion (ppm) | Proportion (%) |
| --- | --- | --- | --- |
| La | 32.8 | 24.0 | 42.3 |
| Ni | 65.2 | 30.7 | 54.0 |
| Al | 1.9 | 2.1 | 3.8 |

COMPARATIVE EXAMPLE 1a

A hydrofluoric anhydride in which alloy powder $LaNi_{4.7}Al_{0.3}$ is not melted was used for highly activating the alloy $TiFe_{0.8}Mn_{0.2}$ in the same method and condition as the example I.

COMPARATIVE EXAMPLE 1b

The alloy $TiFe_{0.8}Mn_{0.2}$ was mechanically powdered and classified into less than 250 µm and the fluoridization was not carried out.

Evaluation

Figure 1:
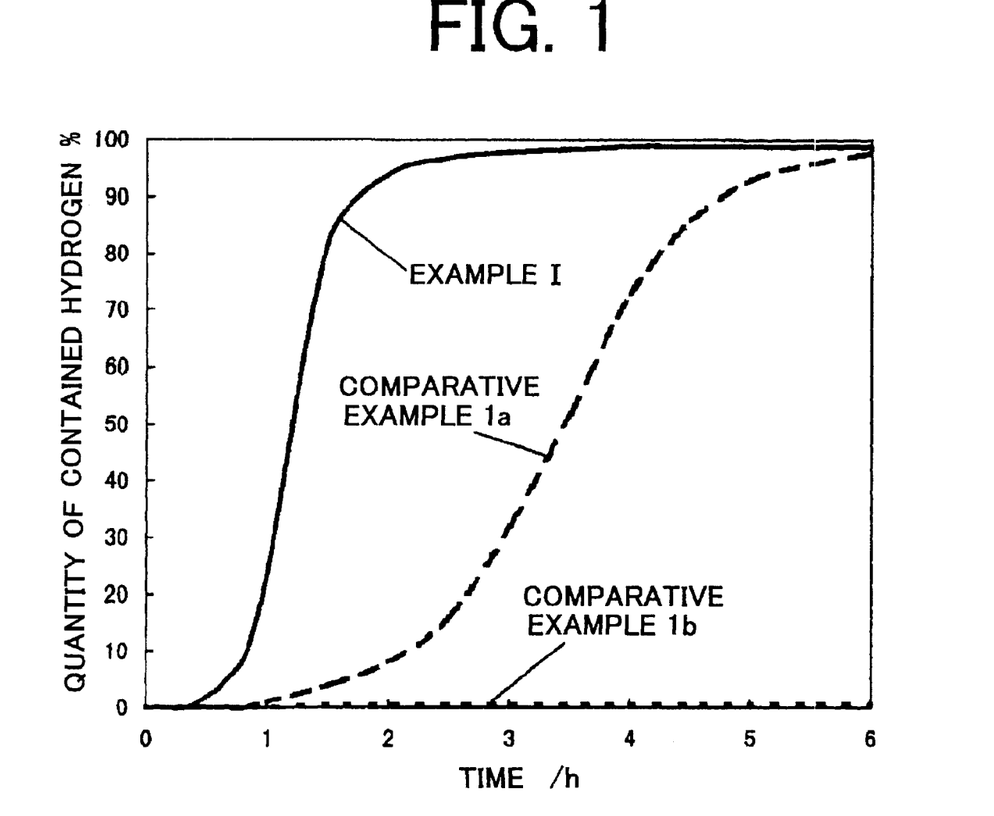
FIG. 1 is a graph showing the relationship between the time necessary for absorbing hydrogen and the hydrogen concentration in the example I.

Initial activation characteristics of $TiFe_{0.8}Mn_{0.2}$ of the example I, comparative examples 1a and 1b were evaluated in the same conditions and compared. The transverse of FIG. 1 shows time necessary for containing hydrogen, and the vertical line shows the quantity of contained hydrogen, in the case that a maximum containing quantity of an untreated alloy is set to 100%.

As the reaction conditions, the air in the reaction vessel was discharged by the evacuation at the alloy temperature of constant 80° C. until the inside pressure becomes 1 Pa, and the vacuum discharge was further continued for thirty minutes, and then hydrogen was introduced at the initial pressure of 2.5 MPa. On the other hand, all test pieces were left in the atmosphere controlled at the temperature of 25° C. and the humidity of 30% for 24 hours. The results are as follows.

The untreated alloy $TiFe_{0.8}Mn_{0.2}$ of the comparative example 1b did not absorb the hydrogen despite the passage of 6 hours.

The alloy of the comparative example 1a started to absorb the hydrogen at the time of one-hour passage, and contained quantity of about 100% of the hydrogen after 5 hours.

On the other hand, the alloy of the example I started to absorb the hydrogen after 30 minutes, and contained quantity of almost 100% of the hydrogen after 2.5 hours.

Although the alloy of the comparative example 1a also has a high reactivity with hydrogen compared with the untreated alloy of the comparative example 1b, the alloy of the example I has a more higher reactivity than the comparative example 1a.

As a modification of the example I, the alloy $MmNi_{4.5}Al_{0.5}$ was used instead of the alloy $LaNi_{4.7}Al_{0.3}$, and the same treatment as the example I was carried out. In accordance with the evaluation similar to the example I, it was confirmed that the same effects as the example I were achieved.

Figure 2:
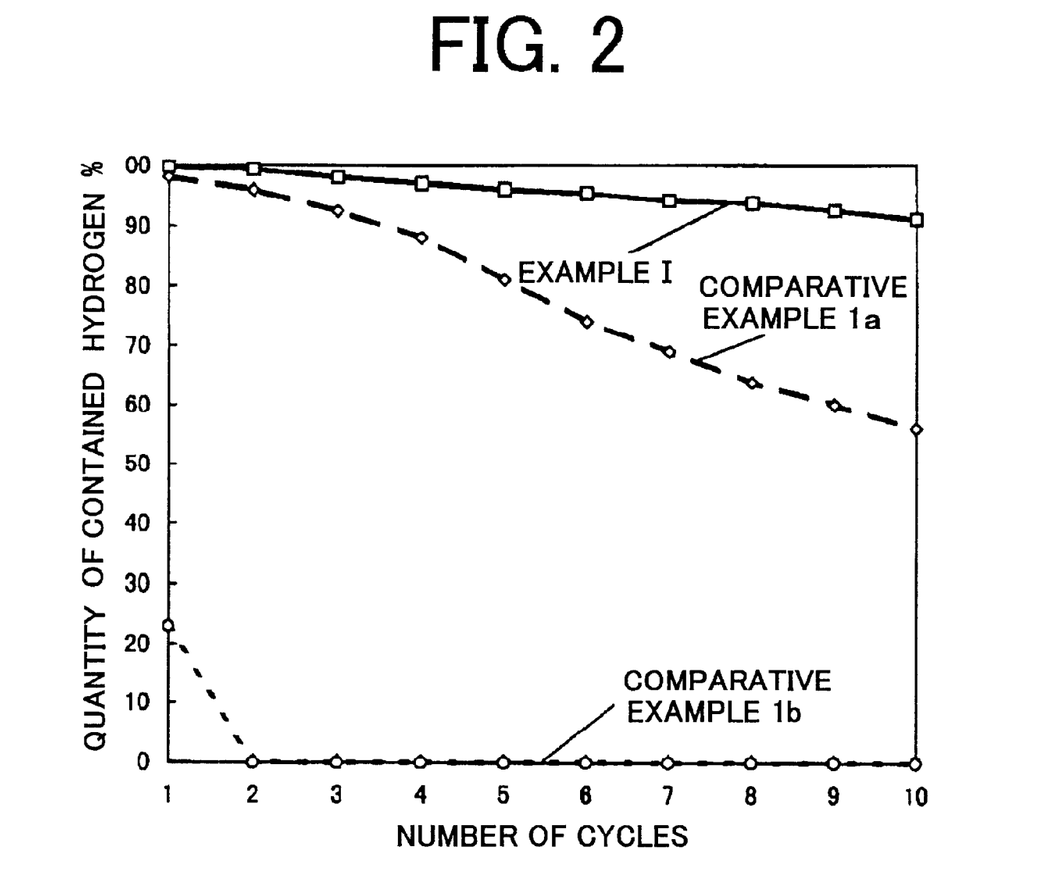
FIG. 2 is a graph showing the change of the amount of hydrogen absorption in the example I.

FIG. 2 shows the fact that the test piece treated by the example I has a poisoning restraining effect against the poison of the poisonous materials other than the hydrogen element, compared with comparative examples 1a and 1b. The transverse of FIG. 2 shows the number of the cycles of the containing and discharging of hydrogen, the vertical line shows the ratio of the change of the hydrogen containing quantity in the case that the initial hydrogen containing quantity is set to 100% when the high purity hydrogen of 7N is used.

As the activation treatment before the test, the air in the treating vessel, in which the alloys of the example I and of the comparative examples are contained, was discharged by the evacuation until 1 Pa at 80° C. Thereafter, the high purity hydrogen gas of 7N was introduced in the reaction vessel at the introduction pressure of 3 MPa. The activation treatment was carried out 5 times. After the activation treatment, in order to confirm the initial hydrogen containing quantity, the 7D high purity hydrogen gas including CO of 1,044 ppm was introduced at the introduction pressure of 3 MPa at 80° C. for 10 minutes, so that the hydrogen is to be included in the test piece. The obtained value by the treatment was used as the initial hydrogen containing quantity. Thereafter, poisoning test was carried out. In the poisoning test, the same treatment as the above described initial hydrogen containing treatment was performed. After the poisoning test, the hydrogen in the reaction vessel was spontaneously emitted at 80° C. Until the pressure in the vessel becomes 12 MPa, and the change of the hydrogen containing quantity was confirmed at every cycle.

The hydrogen containing quantity of the untreated alloy of the comparative example 1b decreased to 23% at the first cycle and to 0% at the second cycle. Although the hydrogen containing quantity of the comparative example 1a decreased to 56% at the tenth cycle, the alloy had a poisoning restraining effect compared with the comparative example 1b.

On the other hand, the alloy of the example I maintained the hydrogen containing quantity more than 90% at the tenth cycle. In other words, the alloy has a great poisoning restraining effect.

As a result of the analysis of gas components at the emission by the gas chromatography, there was confirmed that $CH_4$ was included in the emission gas of the example I and CO was less than the detection lower limit. In the comparative example 1a, both of $CH_4$ and CO were detected. In the alloy of the comparative example 1b, it was considered that hydrogen is scarcely emitted from the alloy. However, it was confirmed that CO having a higher concentration than the original gas was included in the hydrogen gas in the reaction vessel. Therefore, it is regarded that in the poisoning restraining effect of the hydrogen containing alloy of the present invention, CO as the poisoning element is hydrogenized to be converted to $CH_4$ so that the $CH_4$ is removed from the surface of the alloy.

EXAMPLE II

The alloy $Zr(Fe_{0.75}Cr_{0.25})_2$ as the hydrogen containing material was mechanically powder and classified into less than 250 μm by a screen. The alloy powder of 100 g was put in a first reaction vessel. On the other hand, the element Al was mechanically powdered and classified into less than 100 μm, and the alloy powder of 100 g was put in a second reaction. More than 9N high-purity hydrofluoric anhydride solution of 200 cc was poured in the second reaction vessel and kept for three minutes at a temperature of about 120° C. Thereafter, while the powder Al was filtered by a filter paper, the hydrofluoric anhydride solution was transferred to the first reaction vessel in which the powder of $Zr(Fe_{0.75}Cr_{0.25})_2$ is put. The first reaction vessel was put in a constant temperature tank heated at 80° C. and $N_2$ gas was flowed in the first reaction vessel to vaporize the hydrofluoric anhydride solution, thereby drying the vessel. After the drying, the temperature of the constant temperature tank was increased to 120° C. and kept for one hour to heat-treat the alloy. Thereafter, the hydrogen containing material was cooled to approximately room temperature, while $N_2$ gas was flowed in the first reaction. The hydrogen containing material was taken out from the first reaction vessel. Thus, the alloy powder $Zr(Fe_{0.75}Cr_{0.25})_2$ having a fluoride film of Al on the surface of the powder was obtained.

According to the observation of the surface of the alloy $Zr(Fe_{0.75}Cr_{0.25})_2$, it was confirmed that there is existed FAl which do not exist in the untreated alloy as a result of the element analysis of the surface of the alloy $Zr(Fe_{0.75}Cr_{0.25})_2$ after the treatment with an energy dispersion type X-ray analysis device.

COMPARATIVE EXAMPLE 2a

A hydrofluoric anhydride in which alloy powder Al is not melted was used for highly activating the alloy $Zr(FE_{0.75}Cr_{0.25})_2$ in the same method and condition as the example II.

COMPARATIVE EXAMPLE 2b

The alloy $Zr(Fe_{0.75}Cr_{0.25})_2$ was mechanically powdered and classified into less than 250 μm and the fluoridization was not carried out.

Evaluation

Figure 3:
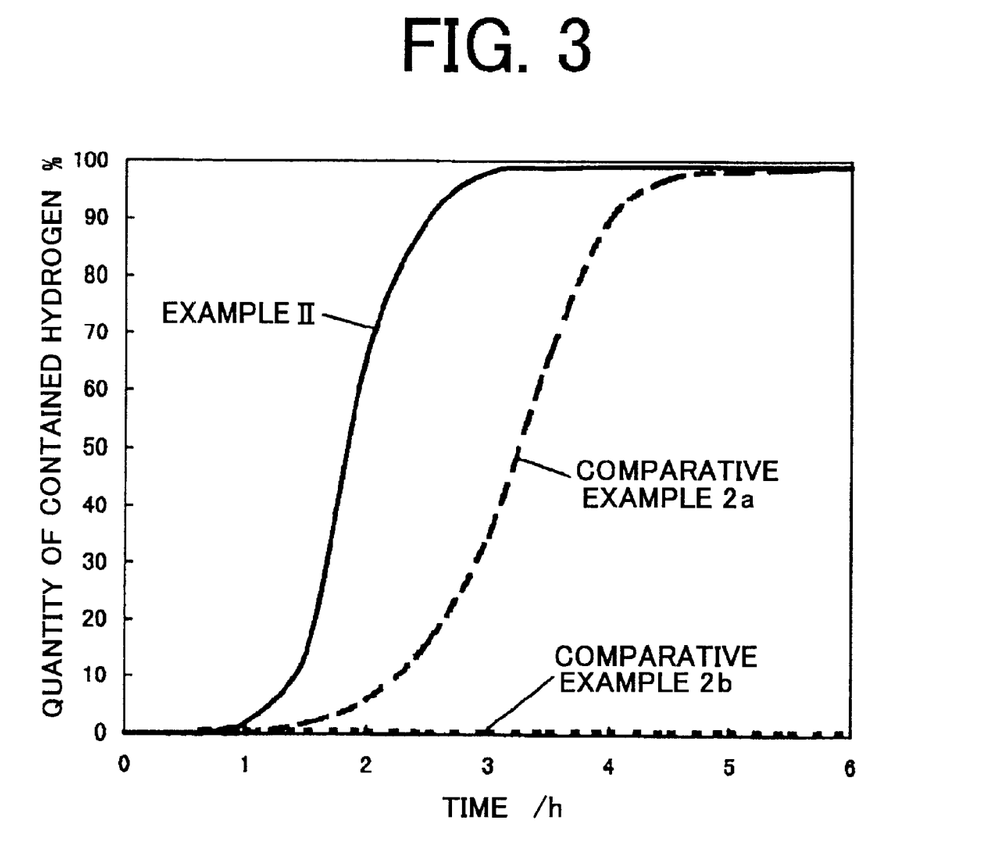
FIG. 3 is a graph showing the relationship between the time necessary for absorbing hydrogen and the hydrogen concentration in the example II.

Initial activation characteristics of $Zr(Fe_{0.75}Cr_{0.25})_2$ of the example II, comparative examples 2a and 2b were evaluated in the same conditions and compared. The transverse of FIG. 3 shows time necessary for containing hydrogen, and the vertical line shows the quantity of contained hydrogen, in the case that a maximum containing quantity of an untreated alloy is set to 100%.

As the reaction conditions, the air in the reaction vessel was discharged by the evacuation at the alloy temperature of constant 60° C. until the inside pressure becomes 1 Pa, and the vacuum discharge was further continued for thirty minutes, and then hydrogen was introduced at the initial pressure of 1.5 MPa at 60° C. On the other hand, all test pieces were left in the atmosphere controlled at the temperature of 25° C. and the humidity of 30% for 24 hours. The results are as follows.

The untreated alloy $Zr(Fe_{0.75}Cr_{0.25})_2$ of the comparative example 2b did not absorb the hydrogen despite the passage of 6 hours.

The alloy of the comparative example 2a started to absorb the hydrogen at the time of 1.5-hour passage, and contained quantity of about 100% of the hydrogen after 4.5 hours.

On the other hand, the alloy of the example II started to absorb the hydrogen after one hour, and contained quantity of almost 100% of the hydrogen after 3 hours.

Although the alloy of the comparative example 2a also has a high reactivity with hydrogen compared with the untreated alloy of the comparative example 2b, the alloy of the example II has a more higher reactivity than the comparative example 2a.

As a modification of the example II, Fe, Mg, Ca or Li was used instead of Al and the same treatment as the example II was carried out. In accordance with the evaluation similar to the example II, it was confirmed that the same effects as the example II were achieved. The test of the poisoning restraining effect of the hydrogen containing material of the example II was carried out in the same manner as the example I. As a result of the test, it was confirmed that the hydrogen containing material of the example II has a great poisoning restraining effect although there are individual differences, and $CH_4$ is included in any emitted hydrogen gases.

EXAMPLE III

The alloy V(vanadium) as the hydrogen containing material was mechanically powder and classified into less than 75 μm by a screen. The V powder of 10 g was put in a first reaction vessel. On the other hand, Mg was mechanically powdered and classified into less than 250 μm, and Mm was mechanically powdered and classified into less than 1 mm and Mg powder 15 g and Mm powder 15 g were put in a second reaction vessel. More than 9N high-purity hydrofluoric anhydride solution of 100 cc was poured in the second reaction vessel and kept for three minutes at a temperature of about 100° C. Thereafter, while the powders Mg and Mm were filtered by a filter paper, the hydrofluoric anhydride solution was transferred to the first reaction vessel in which the powder of V is put. The first reaction vessel was put in a constant temperature tank heated at 50° C. and $N_2$ gas was flowed in the first reaction vessel to vaporize the hydrofluoric anhydride solution, thereby drying the vessel. After the drying, the temperature of the constant temperature tank was increased to 120° C. and kept for one hour to heat-treat the powders. Thereafter, the hydrogen containing material was cooled to approximately room temperature, while $N_2$ gas was flowed in the first reaction. The hydrogen containing material was taken out from the first reaction vessel. Thus, the V powder having a fluoride film of Mg and Mm was obtained.

According to the observation of the surface of V, it was confirmed that there is existed F which does not exist in the untreated alloy Mg and La, Ce, Pr, Nd and Sm which are component elements of Mm, as a result of the element analysis of the surface of the alloy after the treatment with an energy dispersion type X-ray analysis device.

COMPARATIVE EXAMPLE 3a

A hydrofluoric anhydride in which Mg and Mm are not melted was used for highly activating V powder in the same method and condition as the example III.

COMPARATIVE EXAMPLE 3b

The vanadium V was mechanically powdered and classified into less than 75 μm and the fluoridization was not carried out.

Evaluation

Figure 4:
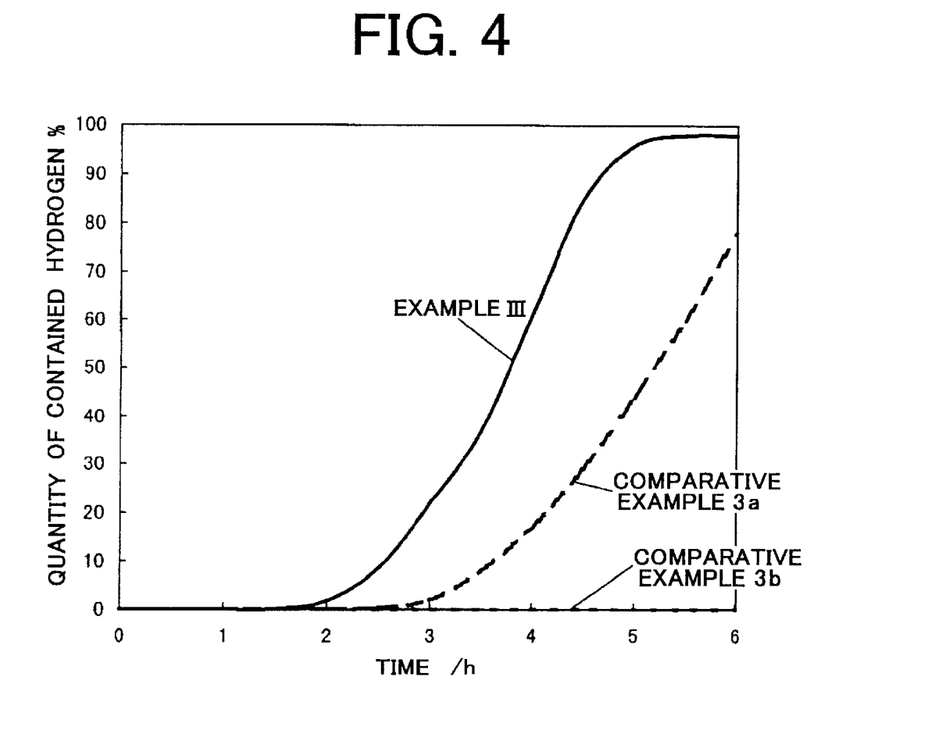
FIG. 4 is a graph showing the relationship between the time necessary for absorbing hydrogen and the hydrogen concentration in the example III.

Initial activation characteristics of the example III, comparative examples 3a and 3b were evaluated in the same conditions and compared. The transverse of FIG. 4 shows time necessary for containing hydrogen, and the vertical line shows the quantity of contained hydrogen, in the case that a maximum containing quantity of an untreated alloy is set to 100%.

As the reaction conditions, the air in the reaction vessel was discharged by the evacuation at the alloy temperature of constant 60° C. until the inside pressure becomes 1 Pa, and the vacuum discharge was further continued for thirty minutes, and then hydrogen was introduced at the initial pressure of 1.5 MPa at 60° C. On the other hand, all test pieces were left in the atmosphere controlled at the temperature of 25° C. and the humidity of 30% for 24 hours. The results are as follows.

The untreated V of the comparative example 3b did not absorb the hydrogen despite the passage of 6 hours.

The vanadium V of the comparative example 3a started to absorb the hydrogen at the time of three-hour passage, and contained quantity of about 80% of the hydrogen after 6 hours.

On the other hand, V of the example m started to absorb the hydrogen after two hours, and contained quantity of almost 100% of the hydrogen after 5 hours.

Although the alloy of the comparative example 3a also has a high reactivity with hydrogen compared with the untreated alloy of the comparative example 3b, the vanadium of the example III has a more higher reactivity than the comparative example 3a.

The test of the poisoning restraining effect of the hydrogen containing material of the example III was carried out in the same manner as the example I. As a result of the test, it was confirmed that the hydrogen containing material of the example II has a great poisoning restraining effect although there are individual differences, and $CH_4$ is included in any emitted hydrogen gases.

An additional evaluation was carried out about the condition of the fluoride layer of the highly activated hydrogen containing material of the example I. As a comparative example 1c, the highly activated hydrogen containing material described in the Japanese Patent Laid Open Publication 10-219301 as an example 5 was used.

Fine particle test pieces of LaNi which were obtained by the hydrogenizing and dehydrogenizing were classified into diameters of 25–50 μm by a filter. As the powder of alumimun fluoride, alumina powder of purity of 2N and diameter of 1 μm produced by the High Purity Chemical Laboratory Co. Ltd. was used. The alumina powder was immersed in the hydrofluoric anhydride solution at the room temperature for one hour and dried in the atmosphere of nitrogen gas of 393 K for one hour. The surfaces of LaNi powder test pieces by the obtained aluminum fluoride powder were improved by the shock method by the high speed air current using NHS-O type produced by the Nara Machine Production Co. Ltd. More particularly, aluminum fluoride powder and $LaNi_5$ of 20 g were charged in the mixer in the capacity ratio of 1 to 50, and mixed at the rotating speed of 1,500 rpm for ten minutes to produce a mixture. The quality of the mixture of 10 g was improved at the rotating speed of 15,000 rpm for 15 hours, thereby to produce capsule particles each of which comprises $LaNi_5$ with a cover of the aluminum fluoride.

Figure 5:
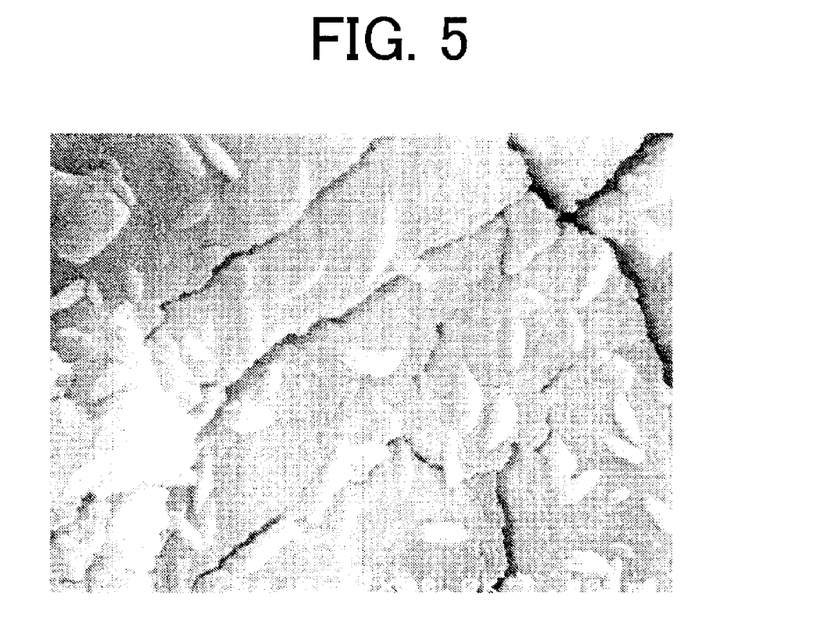
FIG. 5 is a photograph showing a surface condition of a hydrogen containing material in the example I.
Figure 6:
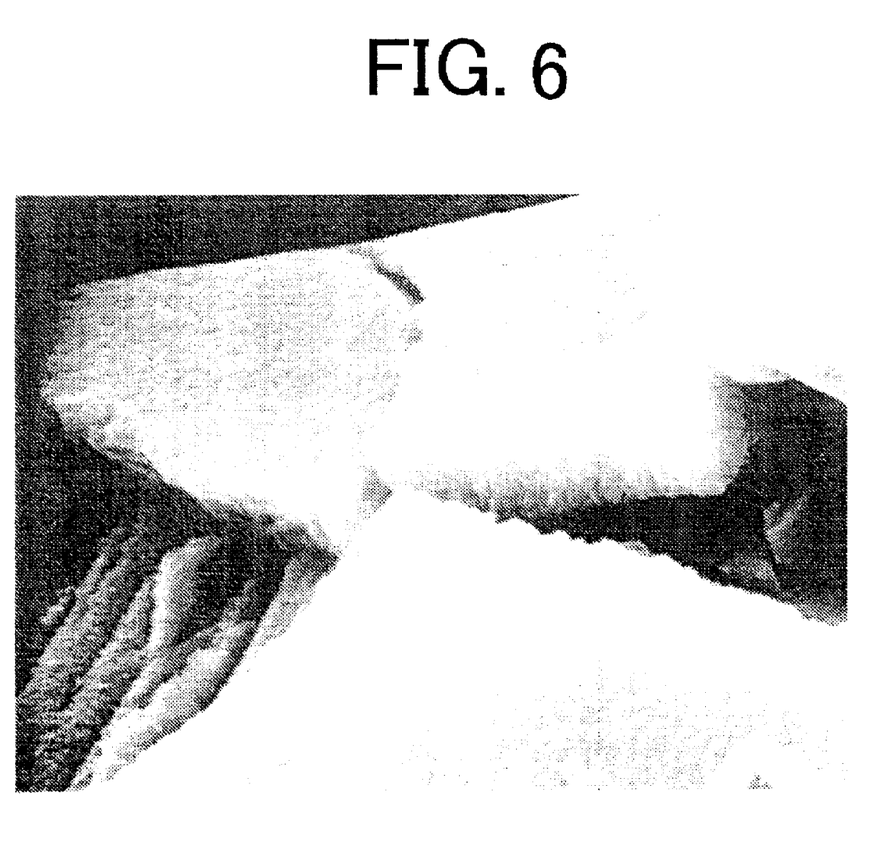
FIG. 6 is a photograph showing a surface condition of a hydrogen containing material in the comparative example 1C.

In the evaluation, 10 g of each of the alloys of the example I and comparative example 1a were put in respective reaction vessels and evacuated up to 0.5 Pa at the temperature of 80° C., and high purity hydrogen of 7N was supplied to each reaction vessel at the pressure of 2.5 MPa for 15 minutes. Furthermore, each reaction vessel was evacuated at the same temperature up to 1 Pa. Regarding the high purity hydrogen supply and the evacuation as one cycle, 1,000 cycles of discharge and supply were carried out. As the result of the observation of the surface condition of the alloy with the electron microscope, there are released portions of the fluoride film on the surface of the alloy of the comparative example 1c as shown in FIG. 6. To the contrary, in the alloy of the example I although cracks were observed, released portions were not observed as shown in FIG. 5.

In accordance with the present invention, in the cases that a large amount of metals which become high active when fluorinated are included in the basic composition elements, that a small amount of metals which become high active are included in the composition elements, or that highly activated metal is not included, in any case, it is possible to form a large amount of very highly activated fluoride layers, compared with a hydrogen containing material which is simply treated by fluorine, on the surface of the hydrogen containing material.

In the boundary surface between the hydrogen containing material as the matrix and the fluoride, a compound layer in which the concentration of elements composing the matrix and the concentration of the fluoride are changed in inclined conditions is formed. The surface of the material is in the condition the fluoride of the matrix and the fluoride of the highly activated metal are mingled.

In another case, in the boundary surface between the hydrogen containing material as the matrix and the fluoride, a compound layer in which the concentration of elements composing the matrix and the concentration of the fluoride are gradually changed in inclined conditions is formed, and the fluoride of the matrix is formed on the outer surface of the compound layer, and further on the outside of the outer surface, the fluoride of the highly activated metal is formed.

By forming the fluoride layer of metal the concentration of which changes in inclined condition, it is possible to prevent the metallic fluoride from exfoliating from the hydrogen containing material. Therefore, it is possible to maintain high activity with hydrogen for a long term in spite of a poisoning environment, while maintaining at least one of durability of the hydrogen containing material itself and a large capacity for absorbing hydrogen.

Furthermore, in accordance with the method for producing hydrogen containing material of the present invention, by contacting the treatment liquid for fluorinating the metal and the hydrogen containing material with each other, the metallic fluoride is formed on the surface or on the surface portion of the hydrogen containing material. Therefore, it is possible to produce the hydrogen containing material by a simple device with ease, and to correspond to the mass production. Thus, it is possible to easily form fluoride having a high activity with hydrogen and having a characteristic for preventing the exfoliation of the fluoride.

While the invention has been described in conjunction with preferred specific embodiment thereof, it will be understood that this description is intended to illustrate and not limit the scope of the invention, which is defined by the following claims.

What is claimed is:

1. A method for producing a hydrogen containing material comprising the steps of:

contacting a metal which becomes highly reactive with hydrogen when the metal becomes a compound including fluorine with a fluorinating treatment liquid, thereby fluorinating the metal; and contacting a hydrogen containing material with the fluorinating treatment liquid contacted with said metal, thereby forming an integral layer comprising a first compound including the hydrogen containing material and fluorine, and a second compound including the fluorinated metal and fluorine on the surface of the hydrogen containing material.

2. The method according to claim 1, wherein said metal is melted in the fluorinating treatment liquid in a metal ion condition or in an ultrafine grain condition.

3. The method according to claim 1, wherein the fluorinating treatment liquid contacted with the hydrogen containing material is heated so as to vaporize the liquid to dry the hydrogen containing material.

4. The method according to claim 1, wherein the metal which becomes highly reactive with hydrogen when the metal becomes a compound including fluorine is at least one metal selected from a rare earth metal, rare earth alloy, Fe, Al, Mg, Ca, Mn, Zn, Zr, Li, or alloys comprising these elements.

5. The method according to claim 1, wherein the fluorinating treatment liquid is a hydrofluoric acid aqueous solution, a hydrofluoric anhydride solution, or a solution comprising at least one organic compound selected from pyridine, triethlamine and isopropyl alcohol, or hydrofluoric anhydride.

* * * * *